Jan. 21, 1958     M. FOGIEL     2,820,937
DIGITAL TO ANALOGUE CONVERTER SERVOSYSTEM
Filed Aug. 2, 1955
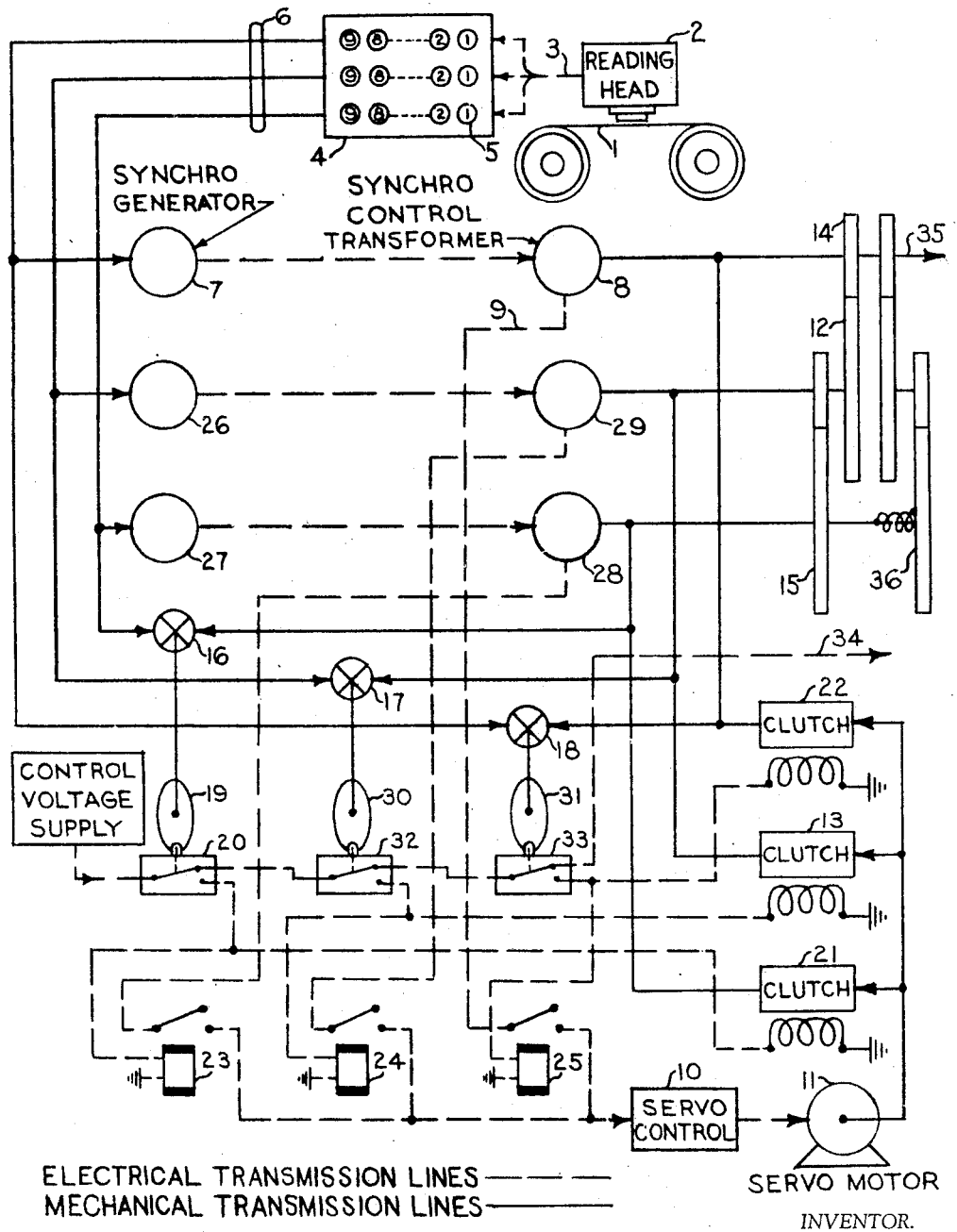
ELECTRICAL TRANSMISSION LINES ─── ─
MECHANICAL TRANSMISSION LINES ─────
SERVO MOTOR
INVENTOR.
Max Fogiel

2,820,937

DIGITAL TO ANALOGUE CONVERTER SERVOSYSTEM

Max Fogiel, New York, N. Y.

Application August 2, 1955, Serial No. 525,856

5 Claims. (Cl. 318—30)

This invention relates to a system which converts a given digital quantity into a corresponding analog quantity which is represented by means of a mechanical shaft rotation.

The digital to analog converter makes it possible to accurately represent digital data in the form of a mechanical analog shaft rotation. The problem of such data conversion arises whenever the data to be processed by an analog computer is supplied in the digital form. Extensive use of such a conversion unit is also made in the automatic machine tool control field where the digital data appears on punched paper tape or magnetic tape and it is necessary to automatically position the machine axes within the accuracy of the given digital data. Thus, in the automatic control of a machine tool such as a milling machine or lathe where a machining accuracy of ±.0001 inch has to be maintained over a range of perhaps 100 inches the commands for the lead screw rotations of the machine tool are generally given in digital form on either of the two tape mediums mentioned. In the case where the resulting position of the cutting tool relative to the work depends on the motion of three lead screws it is not only necessary to rotate the lead screws through the proper designated angle, but it is also essential to perform this action in a definite and prescribed manner in order to obtain the usually desired straight line cutting action of the tool between two given points in space. Until the present time these data conversion requirements have been performed by units which prove to be cumbersome, unreliable, and complex as a result of the many vacuum tubes and pulse techniques which they employ in their systems. The design described in this specification avoids these undesirable characteristics by employing static voltages in conjunction with standard reliable components such as synchros, relays, and servos.

The drawing is a schematic block diagram of the data conversion system including the recording tape which furnishes the digital input data and the mechanical output shaft rotation.

The overall system consists essentially of a component which reads paper or magnetic tape with stored digital data and converts it into plural shaft position information with each shaft position representing a stored digit. These shaft positions are then remotely transmitted via a telepositioning or synchro servosystem, which combines the separate inputs, at the receiver end, into a single shaft rotation representative of the sum of the digitized input information. Referring to the drawing, the stored digital information on tape 1 is read by reading head 2 and converted from electrical form into a plurality of shaft positions by component 4. These shaft positions are remotely transmitted by a synchro servosystem comprising synchro generators such as 7, 26, 27, and corresponding synchro control transformers 8, 29, 28. Servo motor 11 is employed to position the synchro control transformers in accordance with the positions of the corresponding synchro generators. The switches, relays, and clutches make it possible to switch the servo motor to each synchro control transformer in turn so that only one servo motor system is necessary for the entire series of synchros. The separate shaft positions as represented by the synchro control transformers at the receiver end are combined into a single shaft position by means of a gear train such as 12, 14, and 15. This single shaft position represents the sum of the digitized input information.

As shown in the drawing, the tape reader 2 transmits electrical signals 3 to relay board 4. The electrical signals originate by means of the sensing fingers which the tape reader pushes against the tape 1. If, for instance, there is a hole present in the tape, the finger will extend through the tape and close a circuit thus energizing the corresponding line. A tape reader of this type is a standard component and is readily available on the market. The electrical signals act to energize the corresponding solenoid 5 which attracts an armature that in turn rotates a shaft through an angle designated by the coil. The function of the relay board is similar to that of the keyboard present on the conventional adding machine. The depression of each button on the keyboard rotates a shaft through a given angle determined by the value designated to the button. For example the usual keyboard is constituted of ten columns with nine buttons in each column designated 1 to 9 inclusive. Zero in any column is implied by the absence of any button depression. Corresponding to each column a shaft divided into 10 equal parts (0 to 9 inclusive) is rotated by an amount depending upon the particular button which has been depressed in that column. Thus if the button designated 6 is depressed the shaft will rotate to its 6 position. With button 6 depressed in this manner the subsequent depression of any other button in the same column such as button 3 will release the shaft and cause it to return to its zero position after which it will reverse itself and rotate to the three position. The relay board 4 operates in essentially the same way with the exception that electromagnets replace the manual operation of depressing the buttons to rotate the corresponding shaft the proper amount. The deenergizing of any solenoid coil releases the corresponding armature and permits the shaft to return to zero. Connected directly to each of the preceding shafts 6 is a synchro generator 7 which transmits a set of voltages that correspond to the angular position of the synchro shaft. One such synchro generator is provided for each digit in the number. Each generator 7 is electrically coupled to a synchro control transformer 8 which produces a voltage output that represents the difference between the position of its own shaft and that of the generator 7. This voltage 9 is impressed upon the input of a servo control 10 which causes the servo motor 11 to operate in a manner so that the error voltage 9 is reduced to its null value. The servo control 10 acts to amplify the error signal from the synchro control transformers to a sufficient magnitude which will enable the servo motor to operate properly. The servo control can thus be any one of the numerous standard ones available in the transistor, magnetic amplifier, tube, or relay type. The gear 12 is directly driven by servo motor 11 through clutch 13 and it is in mesh with the preceding gear 14 and is geared to succeeding gear 15. The shaft coupled to gear 14 represents the decimal digit which is to the right of that represented by gear 12 and therefore gear 14 performs ten times the number of revolutions of gear 12. Similarly gear 15 represents the decimal digit to the left of that represented by gear 12 and it rotates one-tenth the number of revolutions of gear 12. While one synchro transmission system is provided for each decimal digit, only one servo system is furnished for the combined lot of synchros. For the purpose of illustrating the action of the servo assume that generators 7, 26, 27 indicate the number 257 while the synchro control transformers are all at the zero position. The outputs of differentials 16, 17, and 18 will consequently indicate the difference between the two shaft positions or 2, 5, and 7 respectively. The output of each differential drives a cam which maintains its corresponding switch in a depressed position for any differential output value other than zero. Consequently all three switches 20, 32, 33 shown in Figure 1 will be depressed. This state of the circuit causes clutch 21 to become energized and permits servo motor 11 to drive gear 15. Relay 23 which is also operated thereby connects the output of synchro control transformer 28 with the input to servo control 10. In this manner servo motor 11 will rotate gear 15 until it is in the position which represents 2. When this condition occurs switch 20 will be released, clutch 21 will be deenergized, and switch 32 will cause relay 24 to be operated and clutch 13 to be energized. In this manner, therefore, gear 12 will be rotated to its 5 position. This procedure is sequentially repeated until all synchro control transformers have been properly positioned in accordance with the commands of the synchro generators. The instant at which the positions of all synchro control transformers correspond to those of the generators is indicated by the appearance of a voltage on line 34. By switching the servo system in the preceding manner it is unnecessary to employ a separate servo system for each digit in the number. The angular position of shaft 35 represents the required numerical output within the desired accuracy. While the drawing shows the procedure for only three decimal digits as a matter of illustration, the procedure may be carried through for any number of digits. Backlash arising from the gearing may be overcome by means of conventional backlash loops 36.

I claim:

1. A digital to analog converter comprising in combination a recording means to record digital information, reading means to read said information from said recording means, converting means to accept said digital information and position a shaft for each present digit in proportion to the magnitude of the digit, means to transmit said information from said reading means to said converting means, a synchro generator for each present digit to convert the mechanical shaft position of said converting means to an electrical voltage, means to transmit said shaft positions from said converting means to said synchro generators, a synchro control transformer for each said synchro generator to receive said electrical voltage from said synchro generator and convert it into a corresponding shaft rotation, summing means to indicate the different in the shaft positions of said generator and corresponding control transformer, cams mounted on the output shafts of said summing means to operate switches when said output shafts are at positions which are different from zero, a servo motor to position the shafts of said control transformers in turn beginning with the one which represents the greatest unit, a servo control to control said servo motor, a clutching means for each said control transformer to connect said servo motor to each said control transformer in turn during the period that said servo motor is positioning said control transformer, a switching means to connect in turn the electrical output of each said control transformer into said servo control and simultaneously operate said clutching means, gears to connect the output shafts of said control transformers, and a backlash loop to eliminate the backlash from said gears.

2. The digital to analog converter of claim 1 wherein said summing means consists of mechanical differentials.

3. The digital to analog converter of claim 1 wherein said clutching means consists of solenoid operated clutches.

4. The digital to analog converter of claim 1 wherein said switching means consists of a relay for each present digit, said relay being operated by a cam actuated switch.

5. The digital to analog converter of claim 1 wherein the number of teeth of said connecting gears are proportional to the unit represented by the output shaft of said control transformer.

References Cited in the file of this patent

UNITED STATES PATENTS

| | | |
|---|---|---|
| 2,324,221 | Luhn | July 13, 1943 |
| 2,339,976 | Brown | Jan. 25, 1944 |
| 2,345,281 | Morse | Mar. 28, 1944 |
| 2,354,413 | Walter | July 25, 1944 |
| 2,508,881 | Arnold | May 23, 1950 |
| 2,715,703 | Schuck | Aug. 16, 1955 |
| 2,769,125 | Jacobi | Oct. 30, 1956 |